United States Patent
Olsson et al.

(10) Patent No.: US 8,737,619 B2
(45) Date of Patent: May 27, 2014

(54) METHOD OF TRIGGERING LOCATION BASED EVENTS IN A USER EQUIPMENT

(75) Inventors: Hjalmar Olsson, Bromma (SE);
Richard Carlsson, Stockholm (SE);
Olof Lundstrom, Beijing (CN);
Gerardo Montero Arizmendi, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 263 days.

(21) Appl. No.: 13/128,026

(22) PCT Filed: Jun. 9, 2009

(86) PCT No.: PCT/SE2009/050695
§ 371 (c)(1),
(2), (4) Date: May 6, 2011

(87) PCT Pub. No.: WO2010/053423
PCT Pub. Date: May 14, 2010

(65) Prior Publication Data
US 2011/0219226 A1    Sep. 8, 2011

Related U.S. Application Data

(60) Provisional application No. 61/112,496, filed on Nov. 7, 2008.

(51) Int. Cl.
*H04L 29/06* (2006.01)
*G06F 21/00* (2013.01)

(52) U.S. Cl.
USPC ....................... 380/258; 455/456.3

(58) Field of Classification Search
None
See application file for complete search history.

(56) References Cited

U.S. PATENT DOCUMENTS

| 2004/0015706 A1 | 1/2004 | Eshghi et al. |
| 2004/0203863 A1* | 10/2004 | Huomo ............ 455/456.1 |
| 2005/0044059 A1 | 2/2005 | Samar |
| 2006/0014531 A1 | 1/2006 | Nam et al. |
| 2007/0226502 A1* | 9/2007 | Tenny ............ 713/170 |

FOREIGN PATENT DOCUMENTS

| WO | 2006/007500 A2 | 1/2006 |
| WO | 2008/056283 A2 | 5/2008 |

OTHER PUBLICATIONS

Ren, Q., et al., "Using Semantic Caching to Manage Location Dependent Data in Mobile Computing", MobiCom '00 Proceedings of the 6th annual international conference on Mobile computing and networking, Aug. 6, 2000, pp. 210-221, ACM New York, NY, USA.

* cited by examiner

*Primary Examiner* — Izunna Okeke
(74) *Attorney, Agent, or Firm* — Coats & Bennett, P.L.L.C.

(57) ABSTRACT

Methods, a user equipment, a server host, a client application, computer program products, and a server computer program. These methods and components can be utilized by a location based service. One method regards triggering of events in the user equipment based on a position of the user equipment, comprising the steps of: —looking up, in a server database at least one network cell-identity associated with a predefined geographical area, —sending the network cell-identity to the user equipment, —storing the network cell-identity in a database in the user equipment, —obtaining a current network cell-identity to which the user equipment currently is connected, —comparing in the user equipment the current network cell-identity with network cell-identities stored in the database, and —retrieving content associated with the current network cell-identity if the current network cell identity is among the network cell-identities in the database.

15 Claims, 10 Drawing Sheets

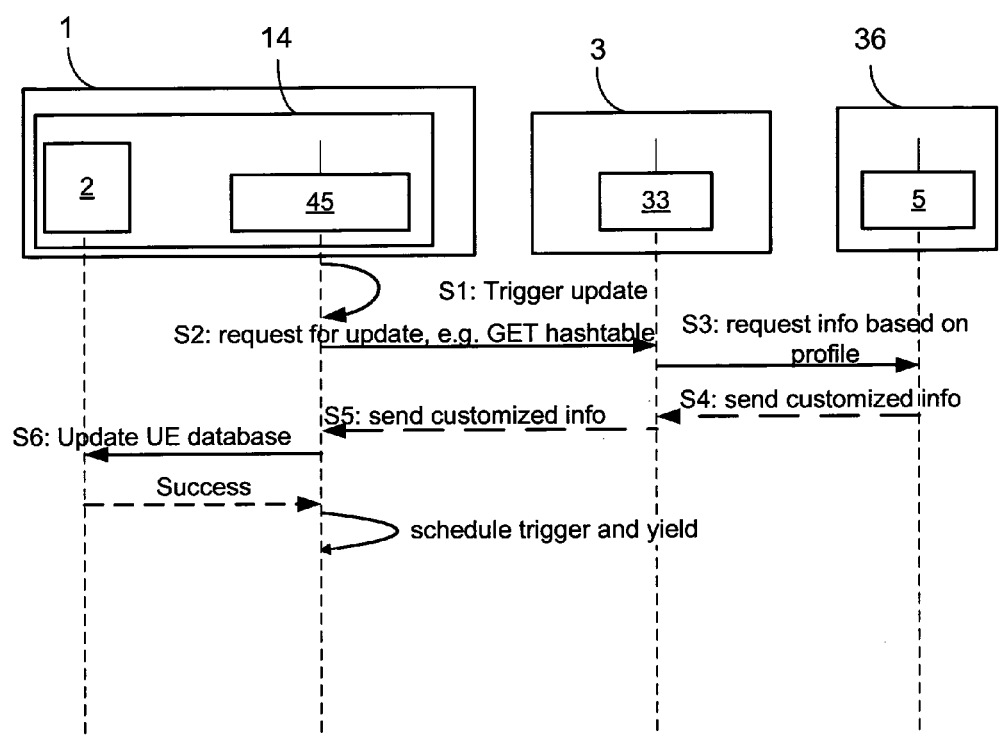

METHOD OF TRIGGERING LOCATION BASED EVENTS IN A USER EQUIPMENT

TECHNICAL FIELD

The invention relates to methods and components, such as UEs (user equipment), server hosts, client applications, server computer programs and computer program products. These methods and components can be utilized by e.g. an LBS (Location Based Service).

BACKGROUND

LBS are becoming more and more popular in mobile stations. These services are typically based on three different positioning technologies: GPS (Global Positioning System), position triangulation with the help of RBS:s (radio base stations) and positioning with the help of communications network cell-ID (cell identity or cell name/number), where the cell-ID typically is a unique number of a cell of GSM (Global System for Mobile Communications)/UMTS (Universal Mobile Telecommunications System)/LTE (Long Term Evolution) for a given operator. Each positioning technology has advantages and disadvantages. GPS gives a relatively exact position under favourable conditions, but requires dedicated hardware, i.e. a GPS receiver circuit, on the client side and is generally not working indoors or in tunnels. Network Cell-ID based positioning, where a mobile station knows which network cell in the mobile communications network it is closest to, generally requires no extra hardware. However a database of mappings between network cell-IDs and a geographical area is needed. In comparison with GPS, positioning systems that utilize network cell-IDs typically does not give as high positioning accuracy and the database needs to be created and updated, which could be especially cumbersome if the database owner is not the network owner/operator. Triangulation with the help of RBS:s typically gives a better accuracy, but far from the accuracy typically given through GPS and requires support from the network owner/operator.

There exist a lot of different applications exploiting positioning systems and a common feature is POIs (points of interest). This feature basically means that certain attractions that are considered to be of interest to a user are displayed on a map in a UE, such as a navigation system in a vehicle or a mobile station. For instance, modern navigation systems for vehicles are typically adapted to show on a displayed map area all gas stations as small gas pump icons. Another beneficial functionality of LBS is the possibility to trigger events/actions based on the location of the UE. A problem when implementing this kind of functionality is that the UE should constantly be aware of its location in order to trigger events. To know its position the UE must either utilize GPS technology or any other satellite based positioning system, such as GLONASS (Global Navigation Satellite System) and GALILEO, or make frequent connections to a server in order to either lookup its current network Cell-ID in a database of Network Cell-IDs mapped to geographic positions or request to be positioned by a radio base triangulation service. As stated before, GPS technology does not work appropriately indoors and frequent connections to a network server demands network- and UE capacity. Furthermore the battery powering the UE is discharged faster.

WO-2007/051223-A1 discloses a system which may enable service differentiation based on current location. For example, if a mobile station subscriber is in a home zone, which may be a smaller zone than a network cell, the tariffs of services utilized by the mobile station may be smaller than if the subscriber is outside the home zone. According to the system a zone may be stored in a SIM (Subscriber Identity Module) card, which in practice makes the system rely on integration with an operator network.

SUMMARY

It is an object of the invention to enable a way or components for the way, which may decrease the energy consumption for a service, e.g. LBS, for activating actions based on the position of the UE.

It is another object of the invention to enable a way for activating actions, e.g. LBS, without revealing the position of the UE.

A first aspect of the invention relates to a method performed by a UE. The method comprises the steps of:
  receiving at least one network cell-identity from a first server host,
  storing the at least one received network cell-identity in a database in the UE,
  obtaining a current network cell-identity to which the UE currently is connected,
  comparing the current network cell-identity with network cell-identities stored in the database, and
  retrieving content associated with the current network cell identity if the current network cell identity is among the network cell-identities stored in the database.

Hereby is achieved that cell-identities, such as those relating to POI:s for a specific LBS can be saved in the UE and compared in the UE with a current network cell-identity without contacting an LBS server every time the UE needs to check on whether there are POI:s in the current network cell.

The method may comprise the step of requesting the at least one network cell-identity before receiving the at least one network cell identity from the first server host. Hereby is achieved that the UE can request updates of network cell-identities when it is appropriate and thereby enable a designer of a service to strike the right balance between an updated database in the UE and the number of cell-ID updates being sent to the UE and the first server host.

The method may comprise the steps of:
  receiving the content from the first server host, and
  storing the content in the database in such a way that the content is associated in the database with the network cell identity.

Hereby is achieved that also content associated with e.g. POI:s in a certain network cell is stored in the database. Thus the UE does not have to request another entity for at least that content. Provided that the UE enters a network cell with a network cell-identity and associated content stored in the database, this saves communication energy and reduces response times for the service, thus leading to improved user satisfaction.

The method may comprise the step of requesting further content from the first server host or a second server host based on the content associated with one of the network cell-identities stored in the database. This enables a designer of an LBS to strike the right balance between downloading and possibly storing of the content in the database in advance and retrieval of the further content more on-demand. The further content may typically have a larger file size than the content stored in the database, but it may of course depend on the service. In a future scenario where UE:s are expected to have much larger memory capacity, the UE:s may be preconfigured for LBS:s and already have a lot of content stored in the database already when the UE is purchased by a consumer.

The method may comprise the step of, if the current network cell-identity is the same as at least one network cell identity stored in the database, checking if the content or further content associated with the current network cell-identity has previously been used for alerting a user of the UE.

The method may comprise the step of displaying a message or an icon on a display of the UE, said message or icon corresponding to the content or further content associated with the current network cell-identity.

A second aspect of the invention relates to a client application comprising computer readable code means which when run on a UE causes the UE to:
  receive at least one network cell-identity from a first server host,
  store the at least one received network cell-identity in a database in the UE,
  obtain a current network cell-identity to which the UE currently is connected,
  compare the current network cell-identity with network cell-identities stored in the database, and
  retrieve content associated with the current network cell-identity if the current network cell-identity is among the network cell-identities stored in the database.

A third aspect of the invention relates to a computer program product comprising computer readable means and the client application, which is stored on the computer readable means.

A fourth aspect of the invention relates to a method performed by a UE. The method comprises the steps of:
  receiving from a first server host at least one cryptographically hashed network cell-identity cryptographically hashed according to a cryptographic hash function,
  storing the at least one cryptographically hashed network cell-identity in a database in the UE,
  obtaining a current network cell-identity to which the UE currently is connected,
  generating a cryptographically hashed current network cell-identity by cryptographically hashing the current network cell-identity according to the cryptographic hash function,
  comparing the cryptographically hashed current network cell-identity with cryptographically hashed network cell-identities stored in the database, and
  retrieving content associated with the cryptographically hashed current network cell-identity if the cryptographically hashed current network cell-identity is among the cryptographically hashed network cell-identities stored in the database.

The cryptographic hash function may be a message-digest algorithm 5.

The method may comprise the step of sending a request message requesting the at least one cryptographically hashed network cell identity before receiving the at least one cryptographically hashed network cell identity from the first server host.

The request message comprises geographical coordinates.

The method may comprise the steps of:
  receiving the content from the first server host, and
  storing the content in the database in such a way that the content is associated in the database with the cryptographically hashed network cell-identity.

The method may comprise the step of requesting further content from the first server host or a second server host based on the content associated with one of the cryptographically hashed network cell-identities stored in the database.

The method may comprise the step of, if the cryptographically hashed current network cell-identity is the same as at least one cryptographically hashed network cell identity stored in the database, checking if the content or further content associated with the cryptographically hashed current network cell-identity has previously been used for alerting a user of the UE.

The method may comprise the step of displaying a message or an icon on a display in the UE, said message or icon corresponding to the content or further content associated with the cryptographically hashed current network cell-identity.

A fifth aspect of the invention relates to a second client application comprising computer readable code means which when run on a UE causes the UE to:
  receive from a first server host at least one cryptographically hashed network cell-identity cryptographically hashed according to a cryptographic hash function,
  store the at least one cryptographically hashed network cell-identity in a database in the UE,
  obtain a current network cell-identity to which the UE currently is connected,
  generate a cryptographically hashed current network cell-identity by cryptographically hashing the current network cell-identity according to the cryptographic hash function,
  compare the cryptographically hashed current network cell-identity with cryptographically hashed network cell-identities stored in the database, and
  retrieve content associated with the cryptographically hashed current network cell-identity if the cryptographically hashed current network cell-identity is among the cryptographically hashed network cell-identities stored in the database.

A sixth aspect of the invention relates to a computer program product comprising computer readable means and the second client application, the second client application being stored on the computer readable means.

A seventh aspect of the invention relates to a method performed by a first server host in a communications network. The method comprises the steps of
  looking up, in a server database, which may be comprised in the first server host or a second server host, at least one network cell-identity associated with a predefined geographical area,
  receiving from the server database the at least one network cell-identity, and
  sending the at least one network cell-identity to a UE together with content associated with the at least one network cell-identity.

The method may comprise the step of receiving a request from the UE about the at least one network cell identity before sending the at least one network cell identity to the UE.

The method may comprise the step of triggering the step of looking up the at least one network cell-identity through a timer function executed in the first server host.

The method may comprise the step of sending to the UE at least one updated network cell-identity for a network cell being a current network cell in which the UE is positioned or a network cell in a second geographical area surrounding the current network cell, if the network cell-identity for the network cell has been changed.

An eighth aspect of the invention relates to a server computer program comprising computer readable code means which when run on a first server host connectable to a UE causes the first server host to:

look up, in a server database, which may be comprised in the first server host or a second server host, at least one network cell-identity associated with a predefined geographical area, receive from the server database the at least one network cell-identity, and send the at least one network cell-identity to a UE together with content associated with the at least one network cell-identity.

A ninth aspect of the invention relates to a computer program product comprising computer readable means and the server computer program, which is stored on the computer readable means.

A tenth aspect of the invention relates to a method performed by a first server host in a communications network. The method comprises the steps of:

looking up, in a server database, which may be comprised in the first server host or a second server host, at least one network cell-identity associated with a predefined geographical area, receiving from the server database the network cell-identity, generating a cryptographically hashed network cell-identity by cryptographically hashing the network cell-identity according to a cryptographic hash function, and sending the cryptographically hashed network cell-identity to a UE together with content associated with the network cell-identity.

The method may comprise the step of receiving a request message from the UE about the network cell identity before looking up the at least one network cell identity.

The geographical area may be defined by geographical coordinates in the request message and in that case the method comprises the step of generating a look up request comprising the geographical coordinates for use in the step of looking up.

The method may comprise the step of triggering the step of looking up the network cell-identity through a timer function executed in the first server host.

The method may comprise the step of sending to the UE at least one updated cryptographically hashed network cell-identity for a network cell being a current network cell in which the UE is positioned or a network cell in a second geographical area surrounding the current network cell, if the network cell-identity for the network cell has been changed.

An eleventh aspect of the invention relates to a second server computer program comprising computer readable code means which when run on a first server host connectable to a UE causes the first server host to:

look up, in a server database, which may be comprised in the first server host or a second server host, at least one network cell-identity associated with a predefined geographical area, receiving from the server database the network cell-identity, generating at a cryptographically hashed network cell-identity by cryptographically hashing the network cell-identity according to a cryptographic hash function, and sending the cryptographically hashed network cell-identity to a UE together with content associated with the network cell-identity.

A twelfth aspect of the invention relates to a computer program product comprising computer readable means and the second server computer program, which is stored on the computer readable means.

A thirteenth aspect of the invention relates to a UE, which comprises:

receiving means configured to receive at least one network cell-identity from a first server host, a database configured to store the received at least one network cell-identity, obtaining means configured to obtain a current network cell-identity to which the UE currently is connected, comparing means configured to compare the current network cell-identity with network cell-identities stored in the database, and retrieving means configured to retrieve content associated with the current network cell-identity if the current network cell-identity is among the network cell-identities stored in the database.

The UE may comprise requesting means configured to request the at least one network cell identity before receiving the at least one network cell identity from the first server host.

The requesting means may be capable of requesting updated network cell-identities from the first server host at regular time intervals.

The requesting means may be capable of requesting updated network cell-identities from the first server host upon manual initiation by a user of the UE.

The retrieving means may be configured to receive the content from the first server host and the database may store the content in the database in such a way that the content is associated in the database with the at least one network cell identity.

The retrieving means may be configured to request further content from the first server host or a second server host based on the content associated with one of the network cell-identities stored in the database.

The UE may comprise checking means configured to, if the current network cell-identity is the same as at least one network cell identity stored in the database, check if the content or further content associated with the current network cell-identity has previously been used for alerting a user of the UE.

The UE may comprise a display and a displaying means configured to display a message or an icon on the display, the message or icon corresponding to the content or further content associated with the current network cell-identity.

A fourteenth aspect of invention relates to a UE, which comprises:

receiving means for receiving from a first server host at least one cryptographically hashed network cell-identity cryptographically hashed according to a cryptographic hash function, a database configured to store the at least one cryptographically hashed network cell-identity, obtaining means configured to obtain a current network cell-identity to which the UE currently is connected, hashing means configured to generate a cryptographically hashed current network cell-identity by cryptographically hashing the current network cell-identity according to the cryptographic hash function, comparing means configured to compare the cryptographically hashed current network cell-identity with cryptographically hashed network cell-identities stored in the database, and retrieving means configured to retrieve content associated with the cryptographically hashed current network cell-identity if the cryptographically hashed current network cell-identity is among the cryptographically hashed network cell-identities stored in the database.

The UE may comprise requesting means configured to send a request message requesting the at least one cryptographically hashed network cell identity before receiving the at least one cryptographically hashed network cell identity from the first server host.

The requesting means may be configured to send geographical coordinates in the request message.

The retrieving means may be configured to receive the content from the first server host and the database may store the content in the database in such a way that the content is associated in the database with the at least one cryptographically hashed network cell identity.

The retrieving means may be configured to request further content from the first server host or a second server host based on the content associated with one of the cryptographically hashed network cell-identities stored in the database.

The UE may comprise checking means configured to, if the cryptographically hashed current network cell-identity is the same as at least one cryptographically hashed network cell identity stored in the database, check if the content or further content associated with the cryptographically hashed current network cell-identity has previously been used for alerting a user of the UE.

The UE may comprise a display and a displaying means configured to display a message or an icon on the display, the message or icon corresponding to the content or further content associated with the cryptographically hashed current network cell-identity.

A fifteenth aspect of the invention relates to a first server host adapted for being connected to a communications network. The first server host comprises:
 lookup means configured to look up in a server database, which may be comprised in the first server host or a second server host, at least one network cell-identity associated with a predefined geographical area,
 first receiving means configured to receive from the server database the at least one network cell-identity, and
 sending means configured to send the at least one network cell-identity to a UE together with content associated with the at least one network cell-identity.

The first server host may comprise second receiving means configured to receive a request from the UE about the at least one network cell identity before sending the at least one network cell identity to the UE.

The first server host may comprise a timer function for triggering the look up.

The sending means may be configured to send to the UE at least one updated network cell-identity for a network cell being a current network cell in which the UE is positioned or a network cell in a second geographical area surrounding the current network cell, if the network cell-identity for the network cell has been changed.

A sixteenth aspect of the invention relates to a first server host adapted for being connected to a communications network. The first server host comprises:
 lookup means configured to look up in a server database, which may be comprised in the first server host or a second server host, at least one network cell-identity associated with a predefined geographical area,
 first receiving means configured to receive from the server database the network cell-identity,
 cryptographic hashing means configured to generate at a cryptographically hashed network cell-identity by cryptographically hashing the network cell-identity according to a cryptographic hash function, and
 sending means configured to send the cryptographically hashed network cell-identity to a UE together with content associated with the network cell-identity.

The first server host may comprise second receiving means configured to receive a request message from the UE about the network cell identity before looking up the at least one network cell identity.

The geographical area may be defined by geographical coordinates in the request message and the look up means may be configured to generate a look up request comprising the geographical coordinates for the look up in the server database.

The sending means may be configured to send to the UE at least one updated cryptographically hashed network cell-identity for a network cell being a current network cell in which the UE is positioned or a network cell in a second geographical area surrounding the current network cell, if the network cell-identity for the network cell has been changed.

A seventeenth aspect of the invention relates to a method of triggering events in a UE based on a geographical position of the UE. The method comprises the steps of:
 looking up, in a server database, which may be comprised in the first server host or a second server host, at least one network cell-identity associated with a predefined geographical area,
 receiving in the first server host the at least one network cell-identity from the server database,
 sending from the first server host the at least one network cell-identity to the UE,
 receiving in the UE the at least one network cell-identity,
 storing the at least one received network cell-identity in a database in the UE,
 obtaining in the UE a current network cell-identity to which the UE currently is connected,
 comparing in the UE the current network cell-identity with network cell-identities stored in the database, and
 retrieving in the UE content associated with the current network cell-identity if the current network cell-identity is among the network cell-identities stored in the database.

An eighteenth aspect of the invention relates to a method of triggering events in a UE based on a geographical position of the UE. The method comprises the steps of:
 looking up, in a server database, which may be comprised in a first server host or a second server host, at least one network cell-identity associated with a predefined geographical area,
 receiving in the first server host the network cell-identity from the server database,
 generating in the first server host a cryptographically hashed network cell-identity by cryptographically hashing the network cell-identity according to a cryptographic hash function,
 sending the cryptographically hashed network cell-identity from the first server host to the UE,
 receiving in the UE the cryptographically hashed network cell-identity,
 storing the cryptographically hashed network cell-identity in a database in the UE,
 obtaining in the UE a current network cell-identity to which the UE currently is connected,
 generating in the UE a cryptographically hashed current network cell-identity by cryptographically hashing the current network cell-identity according to the cryptographic hash function,
 comparing the cryptographically hashed current network cell-identity with cryptographically hashed network cell-identities stored in the database, and
 retrieving in the UE content associated with the cryptographically hashed current network cell-identity if the cryptographically hashed current network cell-identity is among the cryptographically hashed network cell-identities stored in the database.

The content may comprise at least one Uniform Resource Locator associated with the first server host or the second server host. The content may even comprise at least two or more Uniform Resource Locators for retrieval of further content from two or more different servers.

The database may comprise a hashtable in which the network cell identities stored in the database are keys and the associated contents are values.

The content may be related to predefined points of interest.

BRIEF DESCRIPTION OF THE DRAWINGS

The objects, advantages and effects as well as features of the invention will be more readily understood from the following detailed description of embodiments of methods, a UE and a first server host as well as other aspects of the invention when read together with the accompanying drawings, in which:

FIG. 6 is a signaling diagram for updating of information according to an embodiment.

DETAILED DESCRIPTION

Figure 1:
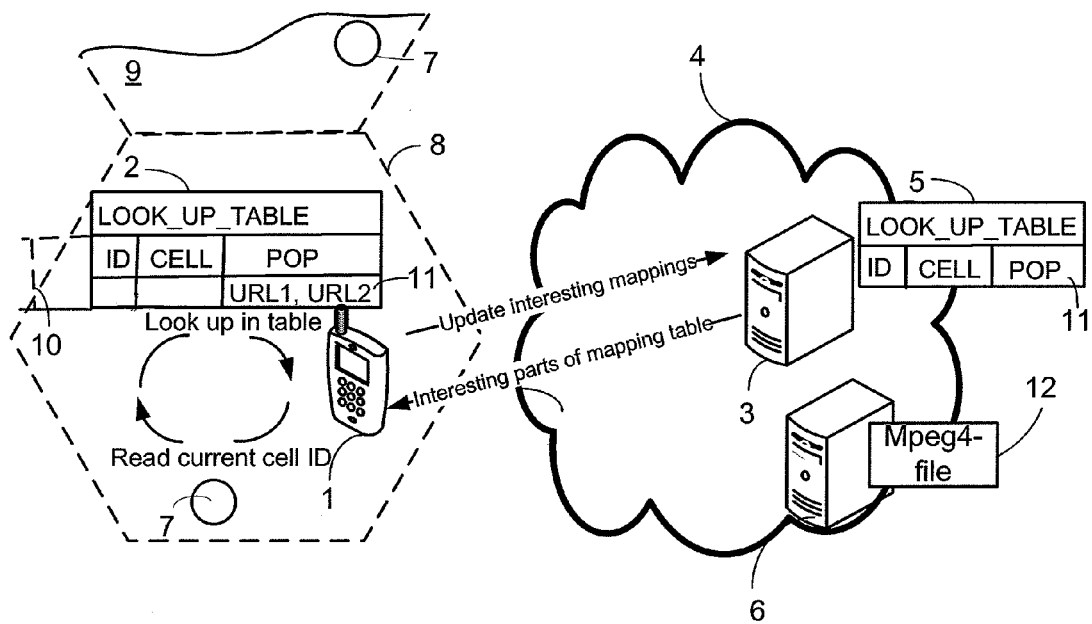
FIG. 1 shows a general view of an embodiment comprising a UE and a server host.

While the invention covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the claimed invention includes all modifications and alternative constructions thereof falling within the spirit and scope of the invention as expressed in the appended claims.

Figure 2:
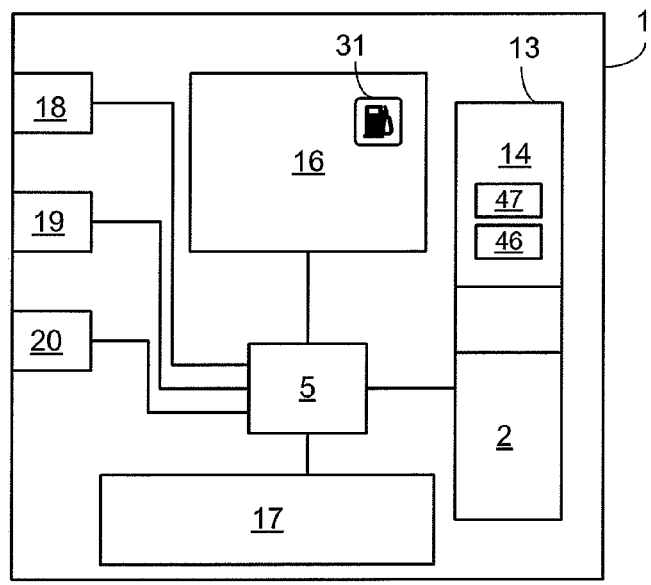
FIG. 2 schematically shows a UE according to an embodiment.

FIG. 1 shows a UE 1 comprising a database 2 (as seen in FIG. 2), although the database 2 is depicted outside the UE 1 in FIG. 1. FIG. 1 also shows a first server host 3 which is capable, via a communications network 4, of communication with the UE 1 and with a server database 5. The server database 5 may be hosted in the first server host 3, in a second server host 6 or in yet another database host (not shown).

To enable developers to develop applications using the location features of mobile devices based on the J2ME™ platform, the Java Specification Request JSR 179: Location API for J2ME and JSR 293: Location API 2.0 have been developed.

Part of JSR 293 is the ability for an application to subscribe to events based geographic proximity, i.e. proximity events. This enables the developer to define a geographic position or area in which the mobile device should alert the application to perform a specific action if the user enters that position/area.

In a UE equipped with a GPS support for JSR 293's proximity events is trivial since the mobile device knows its position. However in a device without a GPS receiver an alternative method of positioning must be used (as described above).

It might be also be good to use cell-id based proximity events even in the case where the UE 1 has GPS support. If proximity events are implemented using GPS position co-ordinates as the triggering mechanism the energy consumption of the UE 1 is expected to be higher, since specific GPS equipment is used instead of exploiting the already in place GSM/3G technology.

The invention provides a way to put alarms/alerts on POI:s 7 which can be triggered by the location of the user carrying the UE 1, in other words triggered by the geographical position of the UE 1. This could be used to inform the user of interesting activities in the immediate surroundings. This is accomplished by mapping at least one POI to a RBS network cell-ID and caching the information in the UE 1. A current network cell-ID, i.e. the cell-ID for a mobile telecommunications network cell 8 in which the UE 1 currently is in, is read by the UE 1 and compared to cached network cell-IDs in the database 5. Thus there is no need for neither a GPS receiver nor repeated lookups for the first server host 3 to determine the location of the UE 1.

Additionally a method is enabled for a service provider to update network cell-ID information in a subscribing user's UE upon the event of changes in the network cell-ID information, which changes may occur due to network topology changes or changes to the user's POI subscription.

The UE 1 may in this description and claims be a mobile station, a laptop, a navigation system device for a vehicle and an embedded telecommunications node in a vehicle or other device that may utilize location based services. FIG. 1 also illustrates a second geographical area 9 adjacent to or surrounding the current network cell 8. Furthermore FIG. 1 schematically illustrates fields in the database 2 with cell IDs 10 stored in the database 2. The cell IDs stored in the database may be plain, concatenated or concatenated and cryptographically hashed in a way described below. Content 11 associated with the stored cell IDs 10 in the database 2 may also be stored in the database and/or the server database 5 and further content 12 associated with the cell IDs 10 may be stored in another entity other than the UE 1 or the first server host 3. In FIG. 1 the further content 12, here in the form of a downloadable mpeg4-file, is for the purpose of illustration stored in the second server host 6. It is to be understood that the content 11 and the further content 12 may be any type of content which could be associated with a POI/network cell. Examples of the content 11 and further content 12 are text messages to be displayed on the UE 1, image files such as gif-, jpeg- and bitmap-files, audio files such as mp3 (MPEG-1 audio layer 3), WAV, WMA (Windows Media Audio), AAC (Advanced Audio Coding), ATRAC (Adaptive Transform Acoustic Coding) and Flac (Free Lossless Audio Coding); video—(and audio files) such as divx-, Xdiv, mpeg2, AVI and mpeg4-files; documents in the form of PDF-files, notepad and Microsoft Excel-, Visio-, Powerpoint- and Word-files, PDF-files; URI:s (uniform resource identifiers), such as SIP (Session Initiation Protocol) URI:s and URL:s to external devices for downloading of additional content etc; and geographical coordinates; and playlists such as a M3U (Moving Picture Experts Group Audio Layer 3 Uniform Resource Locator).

FIG. 2 schematically shows an embodiment of the UE 1 in more detail. The UE 1 comprises a first computer program product 13 in the form of a computer readable medium, which here is a memory, e.g. a ROM (Read-Only memory), a hard disk, an EEPROM (Electrically Erasable Programmable ROM) and a flash memory. The memory here comprises the database 2 and a client application 14. Although not shown in FIG. 2 the database 2 may be a module of the client application 14 or a separate database stored in a second memory (not shown) in the UE 1 other than the computer program product 13, i.e. the database 2 may not be comprised in the same memory as the client application 14 and different modules of the client application 14 may be distributed in different memories of the UE 1. The UE 1 also comprises a processing unit 15, such as a CPU, a display 16, and inputting means 17 in the form of buttons, which may be either physical buttons as indicated in FIG. 2, but also graphically displayed buttons in embodiments where the display 16 is touch-sensitive. Some embodiments of the UE 1 may optionally comprise a WLAN (Wireless local area network) circuit 18 for wireless communication according to any IEEE 802.11 standard and/or a GPS receiver circuit 19 in addition to telecommunications circuits 20 for communication with the first and second server host via e.g. GPRS (General Packet Radio Service) and HSPA (High Speed Packet Access), and very likely in the near future via UE circuits adapted for communication via an LTE (long term evolution) network.

Figure 3:
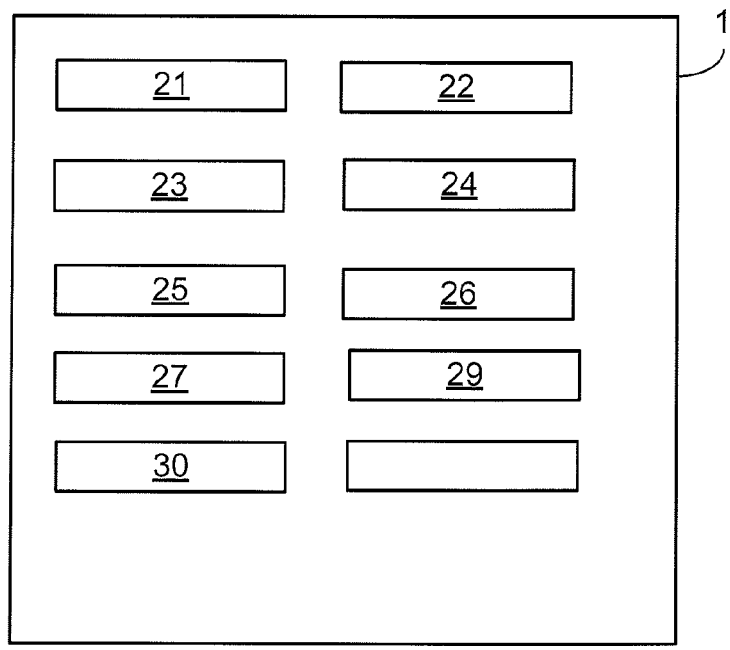
FIG. 3 schematically shows a UE illustrating functional means comprised in embodiments, FIG. 4 schematically shows a first server host according to an embodiment, FIG. 5 schematically shows a first server host illustrating functional means comprised in embodiments.

FIG. 3 illustrates an embodiment of the UE 1 in a slightly different way. Here means of the UE 1 for carrying out process steps are illustrated:

receiving means 21 for receiving from the first server host 3 at least one network cell-identity, which may not be hashed according to an embodiment or cryptographically hashed according to a cryptographic hash function according to another embodiment, obtaining means 22 configured to obtain a current network cell-identity to which the UE 1 is connected, comparing means 23 configured to compare, in the embodiment where the handled cell identities are plain/not hashed the current network cell-identity with network cell-identities 10 stored in the database 2, and in the case where the cell identities are cryptographically hashed, the cryptographically hashed current network cell-identity with cryptographically hashed network cell-identities stored in the database 2, retrieving means 24 configured to retrieve the content 11 associated with the current network cell-identity, which may be cryptographically hashed, e.g. from the first server host 3, and the further content 12, if the current network cell-identity is among the network cell-identities 10, which may be cryptographically hashed and stored in the database 2, hashing means 25 configured to, in the case cell-IDs shall be cryptographically hashed, generate a cryptographically hashed current network cell-identity by cryptographically hashing the current network cell-identity according to the cryptographic hash function, concatenation means 26 configured to, in some embodiments where the current network cell identity shall be cryptographically hashed by the hashing means 25, concatenate the current network cell identity in order to make the effect of the hashing stronger, requesting means 27 configured to send a request message 28 (see FIG. 10) requesting at least one plain/cryptographically hashed network cell identity from the first server host 3, checking means 29 configured to, if the plain/cryptographically hashed current network cell-identity is the same as at least one plain/cryptographically hashed network cell identity stored in the database 2, check if the content 11 or further content 12 associated with the plain/cryptographically hashed current network cell-identity has previously been used for alerting a user of the UE 1, and displaying means 30 configured to display a message or an icon 31 (see FIG. 2) on the display 16, the message or icon 31 corresponding to the content 11 or further content 12 associated with the cryptographically hashed current network cell-identity.

The means illustrated in FIG. 3 may, as will be apparent to a person skilled in the art, be implemented/enabled in the UE 1 by the client application 14 having program modules corresponding to the means and which when run by the processing unit 15 causes the UE 1 to perform the corresponding functions for the UE 1 as described above and in the following. However, although not shown in any figure, the means illustrated in FIG. 3 may also be enabled/implemented at least partly by special hardware circuits such as ASICs (Application Specific integrated Circuits).

Figure 4:
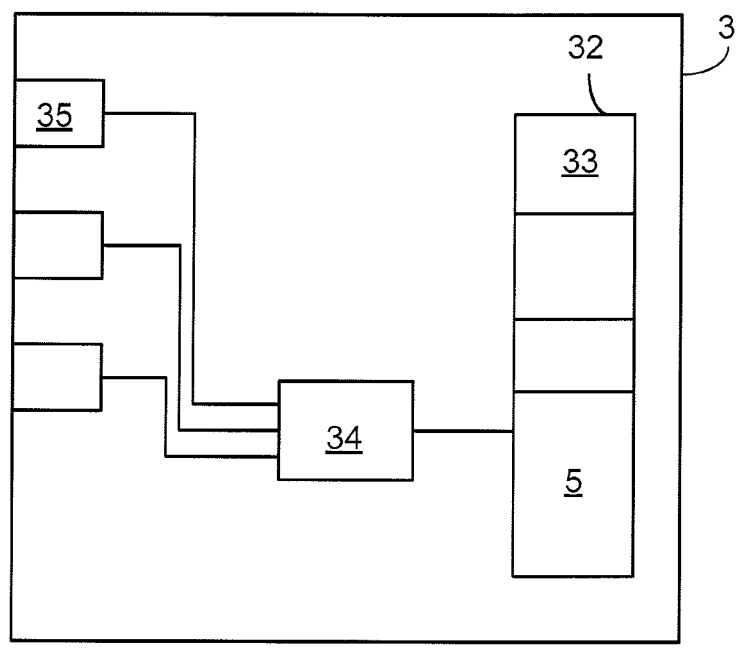

FIG. 4 schematically shows an embodiment of the first server host 3. The first server host 3 comprises a second computer program product 32 in the form of a computer readable medium, which here is a memory, e.g. a ROM (Read-Only memory), a hard disk, an EEPROM (Electrically Erasable Programmable ROM) and a flash memory. The memory here comprises a server computer program 33 and optionally also the server database 5. Although not shown in FIG. 4 the server database 5 may be a module of the server computer program 33 or a separate database stored in a second memory (not shown) in the first server host 3 or in another entity with which the first server host 3 is able to communicate with. Different modules of the server computer program may of course be distributed in different memories of the first server host 3. The first server host 3 also comprises a processor 34, such as a CPU, and at least one communication Input/output 35 adapting the first server host 3 for communication with other units such as the second server host 6, the UE 1, an administrator device/centre or any other suitable device to control the content of the first server host 3, and a database host 36 that in some embodiments host the server database 5.

Figure 5:
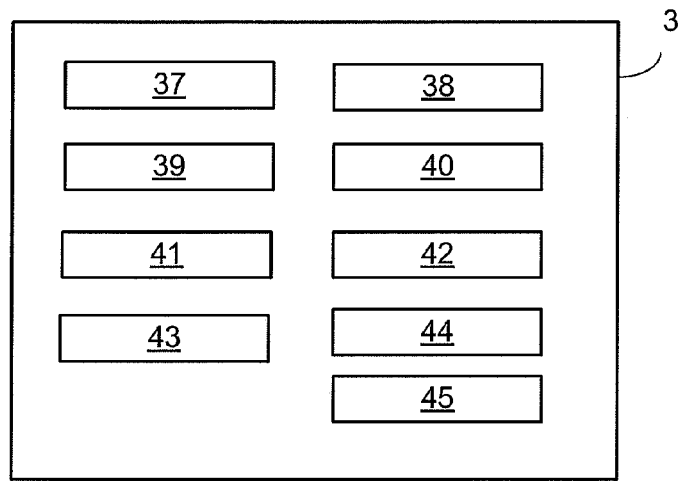

FIG. 5 illustrates an embodiment of the first server host 3 in a slightly different way. Here means of the first server host 3 for carrying out process steps are illustrated:

lookup means 37 configured to look up in the server database 5 at least one network cell-identity associated with a predefined geographical area/POI, which may be defined by geographical coordinates, first receiving means 38 configured to receive from the server database 5 the network cell-identity, cryptographic hashing means 39 configured to generate at a cryptographically hashed network cell-identity by cryptographically hashing the network cell-identity received by the first receiving means 38 according to a cryptographic hash function, first concatenation means 40 configured to, in some embodiments where the network cell identity(-ies) received by the first receiving means 38 shall be cryptographically hashed by the cryptographic hashing means 39, concatenate the network cell identities in order to make the effect of the hashing stronger, since the effect of the cryptographic method exercised by the cryptographic hash function improves on longer strings than shorter strings, sending means 41 configured to send the plain or cryptographically hashed network cell-identity received from the server database 5 to the UE 1 together with content 11 associated with the network cell-identity, second receiving means 42 configured to receive the request message 28 from the UE 1 before the lookup, a timer function 43 for triggering the lookup. e.g. in order to regularly see if cell-IDs in the server database 5 has been updated, a mapping means 44 that keep a mapping between network cell-IDs and POIs. These could be based on some already existing database such as the one maintained by OpenCellID.org or SercPos. The mapping means also enables the first server host 3 to expose POIs 7 to network cell-ID mappings to the UE 1, and determining means 45 configured to determine which of the subscribers to a certain service associated with the first server host 3 that should or ought to be sent updated information with network cell-IDs for that particular service.

The means and the timer function 43 illustrated in FIG. 5 may, as will be apparent to a person skilled in the art, be implemented/enabled in the first server host 3 by the server computer program 33 having program modules corresponding to the means and the timer function 43 and which when run by the processor 34 causes the first server host 3 to perform the corresponding functions for the first server host 3 as described above and in the following. However, although not shown in any figure, the means and the timer function 43 illustrated in FIG. 5 may also be enabled/implemented at least partly by special hardware circuits such as ASICs (Application Specific integrated Circuits).

An embodiment of the invention involves three basic activities:

The client application 14 comprised in the UE 1 updates the Network Cell-ID to POI 7 mapping once in a while. It is very likely that not all mappings will be distributed to the UE 1, it should rather be the ones of interest in order to save memory space and energy used in communication between the first server host 3 and the UE 1. This could be controlled by a profile but, since profiles are directed to specific applications, which is not the concern of this application, it will not be explained more in detail since a person skilled in the art of LBS services would know how to create a profile for a specific LBS. The updating of Network Cell-IDs could be done upon user request via the request message 28, e.g. when new POI:s are selected by the user via the UE 1, or at given time intervals.

The UE 1 obtains the current network cell-id and does a look up in the database 2 holding the Network Cell-ID to POI mapping. This could preferable be done letting the client application 14 run in the background on the UE 1. This task will be performed considerable more often than sending the request message 28, such as every five minutes.

In the event of a change in the server side Network Cell-ID information as stored in the server database 5, e.g. if the location of the POI change, the Network Cell-ID of the RBS in the network is changed, or the mapping of Network Cell-IDs to geographical positions is changed, the first server host 3 sends information about the new Network Cell-IDs to the subscribing user terminals, in this case the UE 1.

According to an embodiment of the UE 1 comprising the client application 14, the UE 1 comprises the following features:

The UE 1 obtains the current network cell-id by being able to read the current Network Cell-ID. This may be already performed on modern mobile phones used today. However the implementation is vendor specific so usually a Java client would need to run different code depending on different mobile phone vendors. This feature could be solved for other mobile phones by implementing a native application, since the current Network Cell-ID is always known to the client in a mobile phone network (see further down for a more detailed description).

The UE 1 is able to connect and receive information from the first server host 3 via e.g. GPRS or HSPA, but it could in one embodiment also connect to the first server host 3 via an IEEE 802.11 standard by having the corresponding WLAN circuit 18.

The UE 1 supports background processes with polling of Network Cell-ID from the first server host 3. That increases the usage of the service, since the polling in embodiments disclosed further down is performed in the background without user interaction. It should however be understood that the invention does not only include embodiments where routines mainly are running as background threads. That is not necessary according to the invention and, for example, in embodiments of the invention PushRegister which is a part of MIDP 2.0 (JSR 118) may be utilized to schedule a timer that performs the same steps/processes/instructions as the background threads in the embodiments disclosed below.

An embodiment of a system implementation of the invention will now be described in more detail in conjunction with FIG. 6. First a mechanism to update the client application 14 with a data structure holding the information about which Network Cell-IDs that are associated with POIs is needed. In a first step S1 an update of information to be sent from the first server host 3 to the UE 1 is triggered. The triggering can according to the invention be performed in different ways, e.g. the client application 14, which may 'run in the background' of the UE 1, may as in the case of FIG. 6, be adapted to cause the UE 1 to at regular time intervals trigger an update of information. This can be done by incorporation of a second timer function 46 in the client application 14. Alternatively or in addition thereto the UE 1 may be caused to trigger the update by manual initiation by the user via the client application 14, i.e. the client application 14 may have a module/feature which allows the user of the UE 1 to initiate an update by e.g. pushing a physical or virtually displayed button of the inputting means 17.

In a second step S2, the client application 14 causes the UE 1 to fetch the information from the first server host 3 with the request message 28, e.g. an HTTP (Hypertext Transfer Protocol) Get message to get a hashtable.

In a third step S3, the first server host 3 receives the request message 28 and in its turn send a request for personalized information, e.g. a customized/personalized hashtable for a certain UE/user, from the server database 5. The server database 5, which may be an SQL database, comprises a "complete" set of network cell-IDs and associated/mapped POIs, i.e. preferably more network cell-IDs and associated/mapped POI than being stored in the database 2, and in a fourth step S4 returns the requested personalized information, e.g. as a customized hashtable including network cell-IDs. In FIG. 6, the first server host 3 and the server database 5 has been illustrated as being comprised in different hosts, the first server host 3 and the database host 36 respectively, but the embodiment according to the steps above of course comprises embodiments where the server computer program 33 and the server database 5 are comprised in the same host. Also, the first server host 3 and the database host 36 may together be seen as the same node in a network node architecture and in that respect the first server host 3 and the database host 36 respectively may not be single devices/computers, but may of course be a server cluster/farm that share the workload and is working as one node as seen from the other nodes that may communicate with the server cluster.

The personalized information and customized hashtable may be generated, stored and retrieved in different ways known to a person skilled in the art. It is a general task which of course is dependent on the LBS that can utilize the invention. However, three examples will be mentioned in the following:

In an embodiment A, the service is to give users of the service information from different shops. In such a service the user can select, e.g. via the UE 1 or via an interface of a second UE (not shown), such as a PC at home, from which shops he/she would like to receive information. The selected shops are stored as relations/associations/edges/links between the user and the selected shops in the server database 5. When the UE 1 starts to use the service or wants to update the database 2, due to e.g. the addition of yet another single shop or multiple shops, the first server host 3, via the lookup means 37 in the first server host 3, retrieves all the shops that the user has selected and build a table/list comprising associated network-cell ID:s for the shops. In other words, multiple stores, i.e. more than one retail enterprise under the same ownership or management, are associated with network cell-IDs. Those network cell-IDs are chosen by the first server host 3 dependent on the home network operator used by the UE 1.

B: Another way is to let the users of an LBS answer a number of questions when they subscribe to the LBS and then, based on the answers to the questions, generate user preference values and connect these preference values with e.g. related shops. Each shop may then be associated with one or more than one preference. Nevertheless, the end result is the same as in the above embodiment A: a connection between shops and users/UEs is established.

C: A third conceivable example is to utilize a machine-learning function comprised in e.g. the first server host 3 and calculate connections/associations between users and shops based on stored electronic tracks or actions, which can be stored in log files, that the user/UE 1 or any apparatus of a service provider generates, such as visited web pages, sent e-mails or e-mail addresses in contacts database, called telephone numbers, electronic social network connections and positioning data.

In a fifth step S5 the first server host 3 receives and forwards the personalized information to the UE 1. This can, for example be accomplished by pushing a file with the personalized information to the UE 1 or sending the personalized information in one or more messages, such as USSD (Unstructured Supplementary Service Data), one or more SMS (Short Message Service) messages or MMS (Multimedia Messaging Service) messages addressed to the client application 14. Thus, preferably, the messages addressed to the client application 14 should not be stored and displayed in an inbox folder for messages intended to be displayed to the user, i.e. not in a typical "messages application for a user" with an inbox and outbox for SMS etc.

In a sixth step S6 the UE 1 receives the personalized information and updates the database 2 with the personalized information. After that a confirmation message that the update has been performed may be generated for an internal log file of the client application 14 and/or as a visual message displayed on the display 16 for the user. The latter message can be advantageous as a response to a manually initiated update. The confirmation message may comprise information not only of the update itself, but also how many records that has been inserted, updated, deleted etc.

Figure 7:
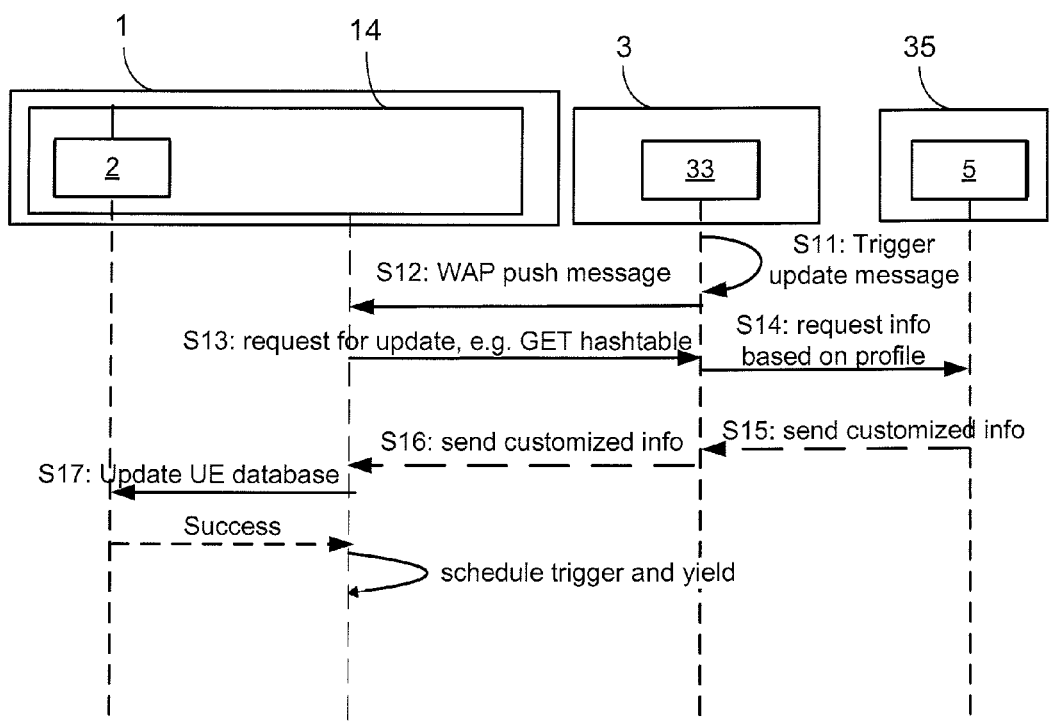
FIG. 7 is a signaling diagram for updating of information according to an embodiment.

FIG. 7 illustrates another embodiment of a system implementation of the invention, wherein the first server host 3 initiates an update of the database 2/lookup table in the UE 1. In comparison with embodiments where the client application 14 triggers the update, this embodiment potentially and in practice could be less traffic intense since the first server 14 may be configured to only send update messages when there really are updates. On the other hand, if updates to the database on the server side are made frequently, this embodiment may be made more traffic intense than the embodiments described in conjunction with FIG. 6 above. In a first step S11 the sending of an update message is triggered by the first server host 3. A triggering event is e.g. that Network Cell-IDs have been changed for some RBS:s related to POIs.

In a second step S12, the first server host 3 sends a WAP (Wireless Application Protocol) push message to the UE 1, wherein the WAP push message indicate to the client application 14 that there is updated information to be retrieved from the first server host 3, e.g. by including a URL (Uniform Resource Locator) to the first server host 3. Hereby the first server host 3 makes it possible for the UE 1 to always have updated, cached network Cell-ID information. The use of a URL in the message could be advantageous in the case where the service require relatively much information to be downloaded.

In a third step S13, the UE 1 sends an update request to the first server host 3 in the same way as described with respect to S2. Optionally, if the received WAP push message comprises a URL or require relatively much data to be downloaded from the first server host 3, the displaying means 30 may cause the UE 1 to display an update question to the user and wait for a confirmation before sending the update request. The following steps are the same as the corresponding steps described above in conjunction with FIG. 6, i.e. step S14 correspond to step S3, step S15 correspond to step S4, step S16 correspond to step S5 and step S17 correspond to step S6.

Figure 8:
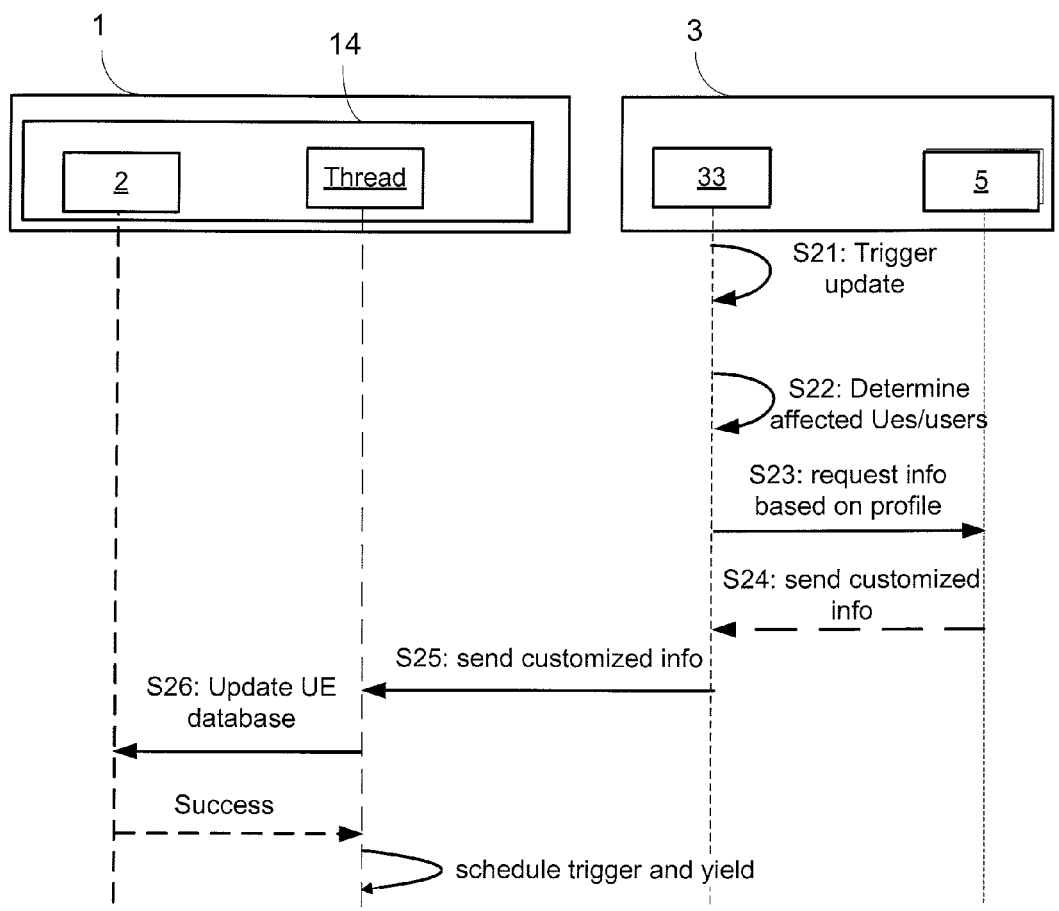
FIG. 8 is a signaling diagram for updating of information according to an embodiment.

FIG. 8 illustrates yet another embodiment of a system implementation of the invention. Here the server computer program 33 is illustrated as being comprised in the same host as the server database 5, but the server computer program 33 and the server database 5 may of course be comprised in different hosts/hardware devices as illustrated in the examples of FIGS. 6 and 7. In a first step S21 of this embodiment the first server host 3 initiates an update of the database 2 based on the occurrence of a trigger event, such as scheduled update at regular time intervals or an update of the server database 5, such as an update of network cell-IDs for a certain network operator associated with a service enabled by the embodiment.

In an optional second step S22, the determining means 46 causes the first server host 3 to determine which of the subscribers to a certain service associated with the server that should or ought to be sent updated information with network cell-IDs for that particular service. If it is determined that a subscriber to the service should be sent updated information, the server in a third step S23 request updated information based on the subscriber/user/UE profile from the server database 5, e.g. in the same way as described with respect to step S3 above. A fourth step S24 corresponds to step S4, a fifth step S25 corresponds to the steps S5 and S16 and a sixth step S26 corresponds to the steps S6 and S17.

Although shown as three separate embodiments, yet other embodiments of a system according to the invention may have the feature of all or any combination of the triggering alternatives disclosed in the description. In other words embodiments may comprise both trigger events triggered in the UE 1 or in the first server host 3, or even by another computer connected to the first server host for e.g. administering the service, profiles and updating the database. Regarding the triggering by the timer function 43 or the first timer function 46, embodiments of the invention may comprise the feature of having a counting function to determine how long the UE 1 has been in one network cell. If the UE 1 is determined to have been in one network cell longer than a predetermined time, the timer counter for triggering the update request can be extended (set to a larger value than the current value), so that update requests are triggered with longer time intervals if the UE 1 is relatively stationary in comparison with a UE that frequently is moved around in different geographical areas.

The UE 1 needs to "constantly", i.e. at predetermined time intervals or by continuously running a checking loop, check if the UE 1 has moved to another geographical position which is associated with a new network cell-ID. This can be accomplished by looking up/searching for the current network cell-ID in the database 2, which as stated above may be a hash table containing network cell-IDs as keys and their associated POIs as values. An embodiment of this will be described more in detail in conjunction with FIG. 9.

Figure 9:
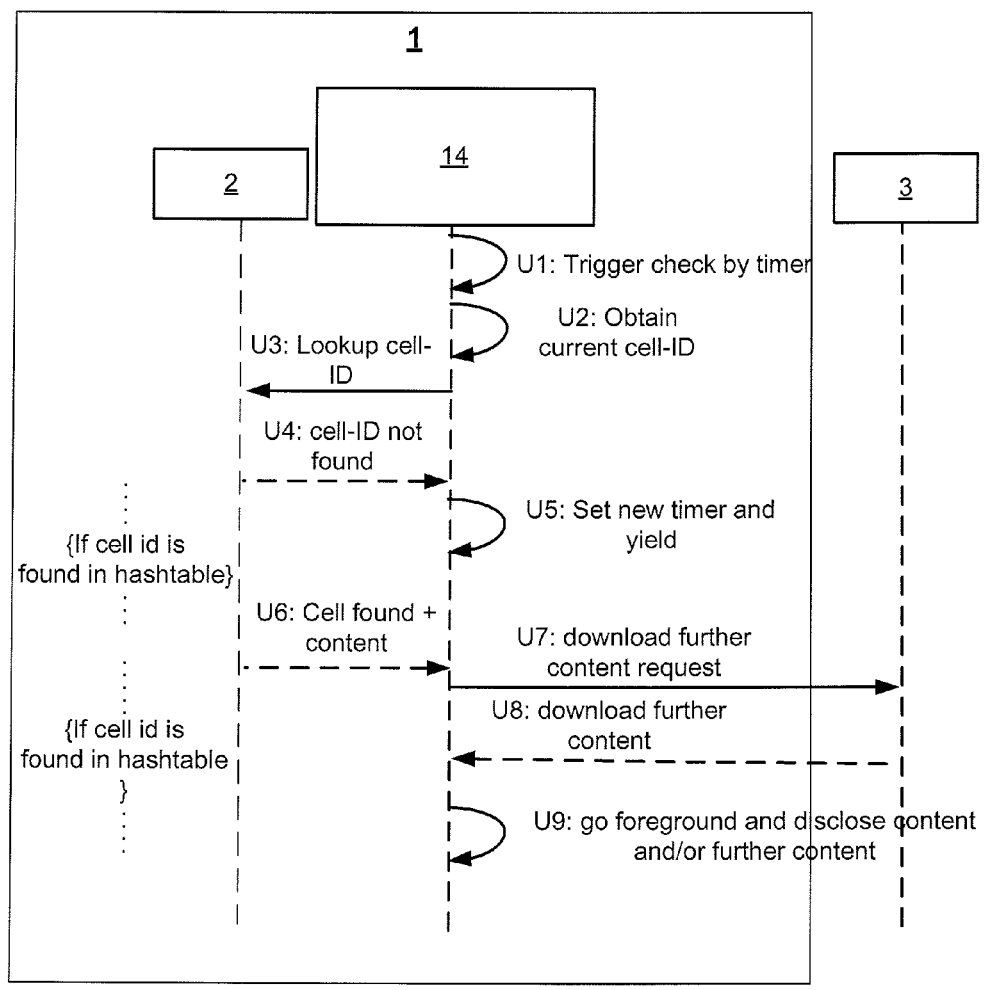
FIG. 9 is a signaling diagram for showing POI according to an embodiment.

In a first step U1 shown in FIG. 9 a network cell-ID correspondence check is triggered, here, as an example only, by the timer function 46.

In a second step U2 the client application 14 causes the UE 1 to obtain the current network cell-ID by checking the current network cell-ID, i.e. the network cell-ID of the cell with which the UE 1 is associated, which usually is the network cell-ID of an RBS with which the UE 1 has or is allowed to have the strongest communication connection with in case the UE 1 may have the possibility to receive signals from more than one RBS. The network cell-ID of the current network cell 8 can be retrieved and stored in the UE 1 via a so-called Cell search, which is the procedure by which a UE acquires time and frequency synchronization with a cell and detects the cell-ID of that cell in e.g. UTRAN (UMTS Terrestrial Radio Access Network) and E-UTRAN.

In a third step U3, the client application 14 causes the UE 1 to search the database 2 for the current network cell-ID obtained in the second step U2. The database 2 may comprise at least one lookup table, which may be implemented in a number of different ways. If the client application 14 is implemented as a Java ME (Micro Edition) Midlet a suitable data structure would be a hashtable. The hashtable would preferably have network cell-IDs as key and the POI:s as associated values. The hashtable may also store information, e.g. in the form of a true or false flag, whether a user has been alarmed already about a POI before. This "alarmed already information" may in the hashtable also be associated with a time stamp. If this "alarmed already information" is stored, the client application 14 comprises marking means/routine 47 that updates such information in the hashtable once a POI message (displayed and/or audio message and/or a signal to another application in the UE 1 or even another device for triggering of a UE external action) has been generated or initiated by the UE 1, optionally with associated time stamps indicating the time when the POI message was generated or initiated. The client application 14 may also comprise means configured to cause the UE 1 to change or reset the "alarmed already information" to "false" (or something with the equivalent function known in the art) if a certain time has passed by comparing a current time with the time stamps at regular time intervals. This certain time may be set either by the service provider or alternatively or in addition thereto by the user via a GUI (graphical user interface) displayed by the UE 1. The client application 14 here also comprises the checking means 29 which adapts the UE 1 to check whether a POI message already has been generated or initiated for a certain network cell-ID/POI. Through the "alarmed already information" the client application 14 is able to avoid that the user is alarmed twice about the same POI, at least within the certain time mention above.

By letting the database 2 comprise a hashtable the data structure would be appropriate for lookups based on a network cell-ID. Network cell-IDs may exist in different formats depending on if an RBS belongs to e.g. a GSM network, 3G/UMTS network and LTE network. A GSM network cell-ID contains 4 hexadecimal numbers, e.g. 07ed, and a 3G network cell-ID contains 8 hexadecimal numbers, e.g. 0015066a. However, as will be discussed more in detail further down in conjunction with FIG. 10, this "local" or network operator dependent cell-ID name may for some embodiments and LBS:s not be enough to clearly, i.e. collision-free, distinguish one network cell from another. In other words the definition of a network cell-ID according to this invention does not only comprise the 4 hexadecimal numbers of a GSM network cell-ID or the 8 hexadecimal number of a 3G network, but any data used to identify network cells and comprising the "local" network cell-ID name.

The kind of content 11 that the hashtable will tie to the network cell-IDs respectively, can depend on the nature of the service that utilizes the invention. As an example, a common content type could be a URL pointing to more information about a POI. This is illustrated in table 1 below, where "VISITED" is a column for information/data related to whether the visited site/file/media corresponding to the associated URL has been displayed before or relatively recently or whether information about that site has been displayed before or relatively recently.

TABLE 1

| CELL_ID (key) | CONTENT (value) | VISITED |
|---|---|---|
| 0015066a | http://localhost/image.jpg | false |
| 0015066a | http://localhost/text.html | true |
| 07ed | http://localhost/video.mpg | true |

In the example described above in Table 1 any content 11, such as text, images, sound, and video can be connected to the POI. This is interesting for services associating rich media to the POI. On the other hand there are other services that associate relatively little information to each POI, such as a short text or an icon for a POI category, typically POI category formats for vehicle navigation systems. In services of the latter example, the client application 14/service could actually store all available information about the POI in the actual lookup table in the UE 1. Then the format of the lookup table would not store a URL, instead the table and the format could look like in Table 2 below.

TABLE 2

| CELL_ID (key) | CONTENT (value) | VISITED |
|---|---|---|
| 0015066a | Gas Station | false |
| 0015066a | Hotel | true |
| 07ed | Museum | true |

Since a subscriber of a specific operator only will access RBS:s from that specific operator (if roaming and mixed networks are excluded) the list of Network Cell-IDs sent to the UE 1 can be optimized by the server side by only including Network Cell-IDs belonging to the home network of the operator of the UE 1. This also means that it will be necessary for the server side of the system to keep multiple network cell-IDs for each POI, in order to guarantee that mobile subscribers from different operators can access the information.

The searched/looked up cell-ID may be found in the database 2 or may not be found in the database 2. If not found the client application 14 in a fourth step U4 determines that the current network cell-ID is not found and in a fifth step U5 set a new timer and go back to a sleeping mode.

In case the current network cell-ID is found in the database 2 the client application 14 in a sixth step U6 retrieves the content 11 associated with the current network cell-ID in the database 2 provided that it is not indicated that the content 11 shall not be disclosed (since it may have been displayed previously). If the database 2 comprises content 11 in the form of URLs as illustrated in Table 1, the associated URL is retrieved from the database 2, for some embodiments provided that "VISITED" is not "true".

In a seventh step U7, provided that the content 11 comprises a URL, the client application 14 causes the UE 1 to request further content 12 from the first server host 3, the second server host 6 or any other server associated with the received URL.

In an eighth step U8, the first server host 3, the second server host 6 or another server send the requested further content 12 to the UE 1, which receives the further content 12.

In a ninth step U9 the client application 14 causes the UE 1 to display the content 11 received from the database 2 and/or the further content 12 received from the first server host 3, the second server host 6 or another server associated with the URL received from the database 2.

The embodiments above described in conjunction with FIGS. 6-9 have substantially been described with the database 2 containing the content 11 and that the content 11 is sent from the first server host 3. However, in other embodiments the content 11 does not necessarily have to be stored in the UE 1 or be sent from the first server host 3. Furthermore, the network cell-ID:s from the server database 5 are sent openly from the first server host 3 to the UE 1 in the embodiments illustrated in FIGS. 6-9. The latter may cause security problem, especially in the case where a predefined geographical area is sent in a request to the first server host 3 and cell-IDs are sent openly in response to the predefined geographical area. By sending the information about the location of the network cells, the cell-ID data is exposed and can be stored by a malicious user. This would increase the risk of someone gradually stealing the cell-id data and building their own cell-id database.

Therefore according to different embodiments of the invention, proximity alerts, i.e. Cell-ID Driven alarms, as a service is provided by providing an open API (application programming interface) where applications wanting to download information about which cells to trigger events on can request cell-ids of cells covering a geographical coordinate and download cryptographically hashed values, e.g. hashed values, of those cell-ids for storing in the database 2 instead of "plain" network cell-ID:s. The client application 14 can then hash the obtained current network cell ID cell-ids according to the same hash function and detect when matching cells.

Figure 10:
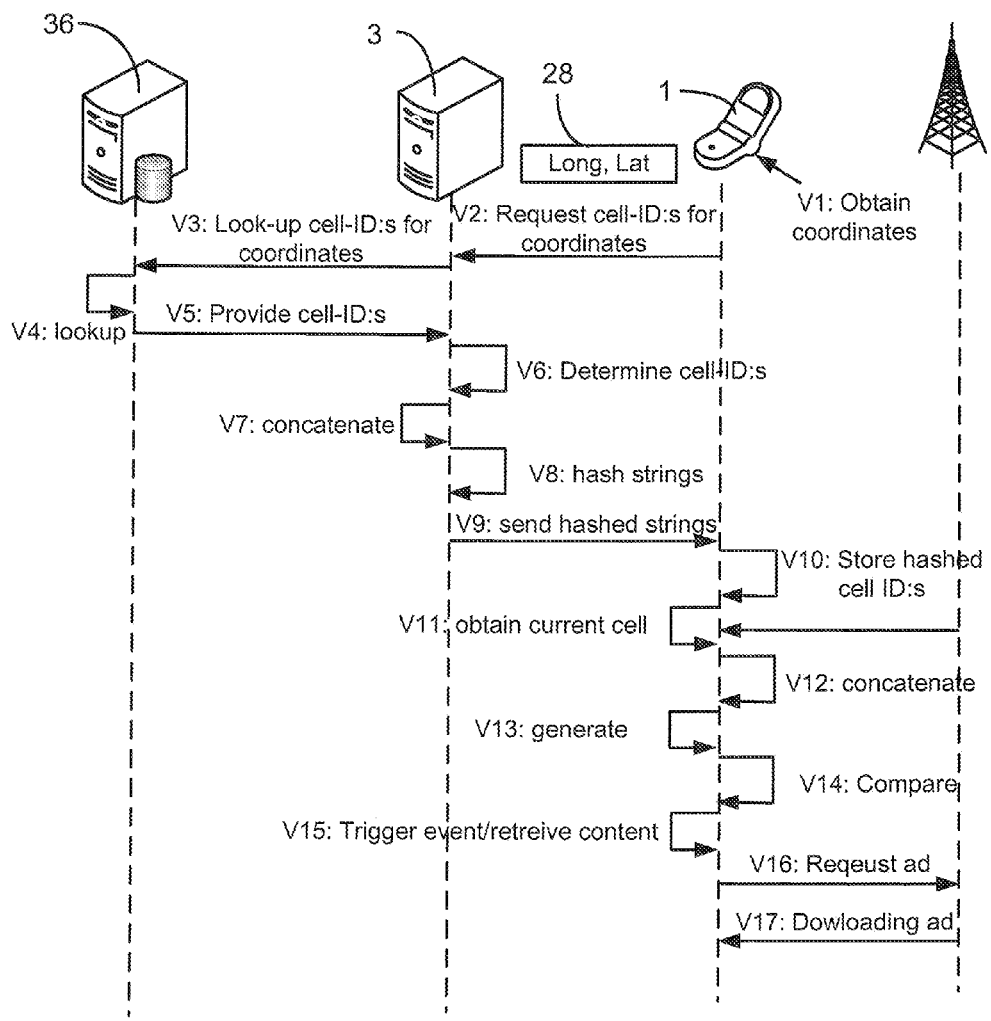
FIG. 10 is a signaling diagram showing triggering of an event according to an embodiment, FIG. 11 schematically shows a vehicle for an exemplary use case.

FIG. 10 gives an overview of the components and process implementing the method of providing proximity alerts by Cell-id as an enabler without exposing the Cell-id data. An embodiment with exemplary coordination numbers etc is described in the following for a use case of an application requesting subscription to proximity events of an LBS based on geographical coordinates, comprising reception of hashed values and matching read cell-id values with them to trigger an event. The following description of the particular embodiment of FIG. 10 does not incorporate the sending of the content 11 from the first server host 3 to the UE 1 along with network cell ID:s to be stored in the database 2, but it must be understood that other embodiments of the invention may comprise the sending of unencrypted or encrypted content 11 along with cryptographically hashed network cell-IDs.

In a first step V1, a client application implemented in J2ME™ needs to subscribe to events triggered by an occasion where the UE 1 is in predefined vicinity, which is the choice of an LBS provider, of the coordinates: latitude=59.19434 and longitude=18.4196 (Stockholm city centre). The coordinates can be obtained by the UE 1 in a number of ways, e.g. inserted manually via a GUI of the client application 14 or retrieved more or less automatically via an API. One way is that the user of the UE 1 look at an announcement provided by a shop, said announcement having the geographical coordinates explicitly stated thereon and then input the geographical coordinates via a GUI. Another way is for the user to simply ask for the geographical coordinates when he/she visits the shop or makes this request via a web-service having a database with postal addresses mapped to their corresponding geographical coordinates. Yet another way is that the UE 1 is provided with the GPS receiver circuit 19 and that the GPS receiver is turned on to retrieve the geographical coordinates and then turned off to save energy. One possible scenario within the scope of this "GPS-way" is that a user is standing on a balcony or roof of a house, where he/she can receive signals from GPS satellites with the UE 1 and wants a location based action/application/service to start when he/she enters the house. Such an action could even be to turn off the GPS receiver, since the GPS signals from GPS satellites are generally too weak or too inaccurate to be relied upon when the UE 1 is inside the house. Still another way to obtain the geographical coordinates is, if the UE 1 comprises an NFC (Near field communication) tag reader (not shown), to read an NFC tag provided with data comprising the geographical coordinates or, e.g. a link to a site where certain geographical coordinates can be retrieved.

In a second step V2, the client application 14 via the UE 1 sends the request message 28, e.g. via HTTP WAP, to the first server host 3. The service could be that the client application 14 shall see to that the UE 1 receive an advertisement when the user is in an area near the coordinates.

In a third step V3, the lookup means 37 causes the first server host 3 to send a lookup request to the database host 36 for matching the geographical coordinates received from the UE 1 to at least one network cell-id and receives cell-id:s that cover the position associated with the geographical coordinates. The server database 5 comprises network cell-ID:s mapped to geographical coordinates for this purpose. Similarly to previously described embodiments, although the server database 5 here is stored in the database host 36, the server database 5 may in other embodiments be stored in the first server host 3.

In a fourth step V4, a lookup in the server database 5 is made in order to retrieve at least one matching cell-ID for a cell that covers the geographical coordinates received in the request from the first server host 3.

In a fifth step V5 at least one matching cell-ID is sent from the server database 5 to the first server host 3, in this embodiment exemplified by two network cell-id:s:
  a. mnc=07, mcc=240, lac=f005, cellid=000f50cd
  b. mnc=07, mcc=240, lac=f005, cellid=000fxb1d
where mnc is the Mobile Network Code, mcc is the Mobile Country Code, lac is the Location Area Code and cellid is the eight hexadecimal number for the "local" name for the cell corresponding to the network cell-ID size in Table 1. As stated above in conjunction with Table 1, the "local" name may not be enough to uniquely identify a certain network cell, so in this embodiment a cell-ID comprises mnc, mcc, lac and cellid values.

In a sixth step V6, the first server host 3 determine, either implicitly by receiving the two cell-ids from the cell-id database 31 or explicitly by e.g. checking the validity of the two received cell-ids by comparing them to cell-id:s in a second cell-id database (not shown). Also, in order to save bandwidth when subsequently communicating with the UE 1, some numbers in the cell-ID name determined as unnecessary may be removed. In this case "000" in the local names of the two examples a and b, thus becoming:
  a. mnc=07, mcc=240, lac=f005, cellid=f50cd
  b. mnc=07, mcc=240, lac=f005, cellid=fxb1d In another embodiment, the removal of "000" may already have been made by the database host 36 before sending the lookup answer to the first service host 3 in the fifth step V5.

In a seventh step V7 the first server host 3 concatenates the received cell information/ID:s into one string for each cell-id. In other words all received parameters for each cell-ID are added to each other, the result being in this example:
  a. 07240f005f50cd
  b. 07240f005fxb1d In order to decrease the possibility of cell-ID collision, a delimiter between the mnc, mcc, lac and cellid may optionally be introduced, resulting in:
  a. 07.240.f005.f50cd
  b. 07.240.f005.fxb1d In an eighth step V8 the two strings are cryptographically hashed using e.g. a cryptographic hash function such as MD5 (Message-Digest algorithm 5) with a 128-bit hash value typically expressed as a 32 digit hexadecimal number. The MD5 is as such known via RFC 1321 and therefore not explained more in detail. The two resulting cryptographically hashed strings are in this example:
  a. 21f610f7e9d9e2ce1 db6bb8f9f9 cc1ef
  b. 4724dda2753236946203faceae210966

In a ninth step V9 the cryptographically hashed strings are sent from the first server host 3 to the client application 14 of the UE 1.

In a tenth step V10 the cryptographically hashed strings are stored in the database 2. In an eleventh step V11, the UE 1 obtains the current network cell-id.

In a twelfth step V12, the client application 14 causes the UE 1 to concatenate the cell-Id of the current network cell 8 in the same way as was done by the first server host 3 in the seventh step V7.

In a thirteenth step V13 the client application 14 causes the UE 1 to hash the concatenated cell-Id of the current network cell 8 using the same cryptographic hash function as used in the eighth step V8. The hashed concatenated cell-IDs may in one embodiment be stored in a second UE database (not shown) in the UE 1, but in another be deleted once a fourteenth step V14 has been performed.

In the fourteenth step V14 the client application 14 retrieves the two resulting cryptographically hashed strings stored in the database 2 in the tenth step V 10 and compare these two strings, and other strings already having been stored before the two strings, in the database 2 with the cryptographically hashed concatenated cell-ID of the current network cell 8 as generated in the thirteenth step V13. If it is detected that some of the values, here in the form of hash values, are identical, an event is triggered in a fifteenth step V15, in this example downloading the content 11 in the form of an advertisement to the UE 1, which is illustrated in FIG. 10 with a sixteenth step V16 of requesting the advertisement from a server entity, which may be the second server host 6 or the first server host 3 and in a seventeenth step V17 receiving the advertisement from that server.

Although the JSR 179 and JSR 293 are very well suited frameworks for an implementation of this embodiment, they are only examples. The mechanism described herein could be implemented using any mobile development environment that can read the current cell-id and communicate with the first server host 3.

Three exemplary use cases for the invention will now be described. In a first exemplary use case, where a service which advertisers, such as owners of stores and restaurants, can use to advertise information about their business and where the users of the service can find information about the advertisers' businesses marked on a map. In such a service, one functionality could be to let users subscribe to information about certain businesses in order to have information sent to the user's mobile phone when the user is close to the location of the business. The following use case is in one embodiment of the invention part of such a service.

1 A user finds a restaurant he/she is interested in on a map displayed on the users UE 1.
2 The user opts for subscribe to information about that restaurant.
3 A server, such as the first server host 3, associated with the service sends a list of Network Cell-IDs (covering the location of the restaurants) back to the UE 1, the list is stored in the record store of the UE 1, e.g. via HTTP WAP.
4 The next day the user with the UE 1 moves close to the selected store and the UE 1 registers in a conventional way to an RBS with a network cell-ID that had been stored the previous day.
5 The UE 1 triggers an event/action, in this case to connect to a node, which may be the server, but also another server such as the second server host 6, associated with the service to request information about the restaurant.
6 The service system sends information about current offers of the restaurant to the UE 1.

The second exemplary use case considers a navigation system/service for vehicles. Users can use this navigation system to receive notifications when they are in a geographical area with high way speed cameras. The following use case is a part of such a service.

Figure 11:
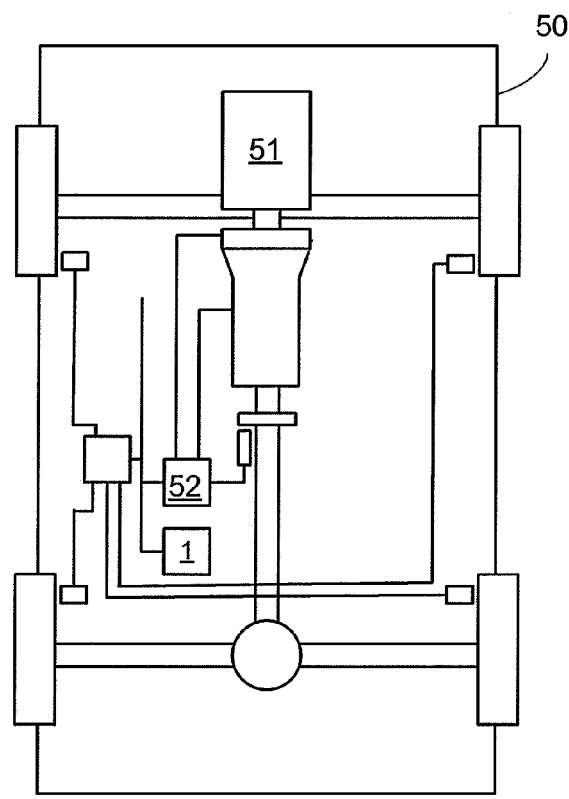

1 A user uses the navigation system, which implement an embodiment of the invention, to directly or indirectly select which routes/highways he/she is going to be driving on, e.g. by, via a navigation device in a vehicle 40 (FIG. 11), selecting a point of destination and letting the navigation system suggest a route to the destination from the current position.

2 The network part of the navigation system sends a list of Network Cell-IDs of RBSs covering areas containing speed cameras and exact locations of the speed cameras back to the user's UE 1, the list is stored in the database 2 of the UE 1, e.g. via HTTP WAP.

3 When the UE 1 registers to an RBS with a Network Cell-ID that has been stored, the user receives a notification from the UE 1 and the nearby speed camera(s) are displayed on a map on the display 16 of the UE 1.

There are of course several other vehicle associated LBS that could utilize the invention. For example, if the UE 1 is connected to a vehicle internal network, it could, upon determination that a current network cell-ID corresponds to a network cell-ID in the database 2, send a message to a node in the vehicle internal network, which causes the node to initiate an action in the vehicle, such as: alerting the driver by e.g. an audio message through loudspeakers in the vehicle 50 or a visual alert on the dashboard;

adjust a speed limiter so that the maximum possible speed of the vehicle is decreased or increased;

adjust the engine 51 of the vehicle 50 in order to affect e.g. noise and pollution;

adjust parameters in an automatic gearbox computer 52 such that e.g. the gears are shifted at different engine speeds than before the adjustment; and adjust the belly clearance of the vehicle 50.

The UE 1 can connect to a node of the vehicle internal network via a USB (Universal Serial Bus) or a Firewire interface known in the art or wirelessly via e.g. Bluetooth or UPnP. Alternatively the UE 1 may be an embedded telematics unit in the vehicle 50 that always is connected to the vehicle internal network via e.g. CAN (Controller Area Network) bus and a FlexRay bus.

The third exemplary use case is a service which users can use to automatically report their current location to a system (or other users) when they are in certain predetermined areas. Such a service could, for instance, be used by a taxi company to keep track of when their taxis are getting close to a location, e.g. an airport, and will soon be free to pick up new passengers. The following use case could be part of such a service.

1. The system sends a list of Network Cell-IDs of RBS:s covering areas where the user is to report in to the user's service. The list is stored in a record store of the database 2, e.g. via HTTP WAP.

2. When the UE 1 registers to an RBS with a Network Cell-ID that has been stored in the database 2, the UE 1 automatically connects to a server of the system and reports its current location.

To sum up, having described some embodiments of the invention, several advantages of the invention or embodiments of the invention should be apparent, such as:

Lower power consumption in the UE 1 since there is no need to use the radio network to contact the server side to check if the current location is associated with any interesting POI.

For the same reason as above the data traffic could be reduced, which gives lower traffic cost.

The UE 1 does not have to tell the server side about its exact location, which is the case of triangulation. Therefore integrity issues are avoided or at least decreased.

There is no need to integrate this invention with a network operator. A service based on this solution can be deployed by an independent service provider.

The database 2 and the client application 14 can be integrated into any kind of client application in the UE 1. The database 2 does not need to reside on a SIM of the UE 1 or be integrated with a SIM application.

In the case of the client application 14 and the server computer program 33, there is no need for additional hardware to enable the invention.

The location information is essentially not based on GPS and can be used indoors as well.

The communication between the UE 1 and the server-side can be protected from third parties trying to copy cell-ID information.

Figure 12:
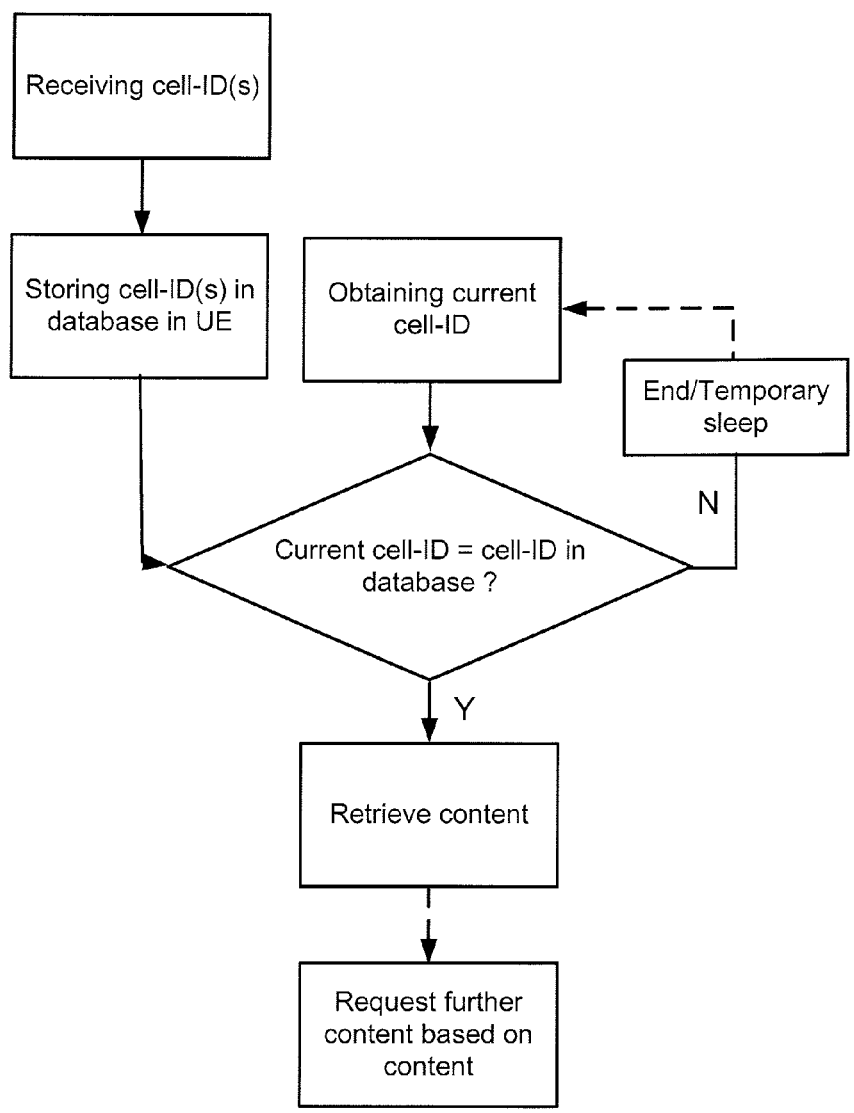
FIG. 12 is a flow diagram of an embodiment of a method for a UE.
Figure 13:
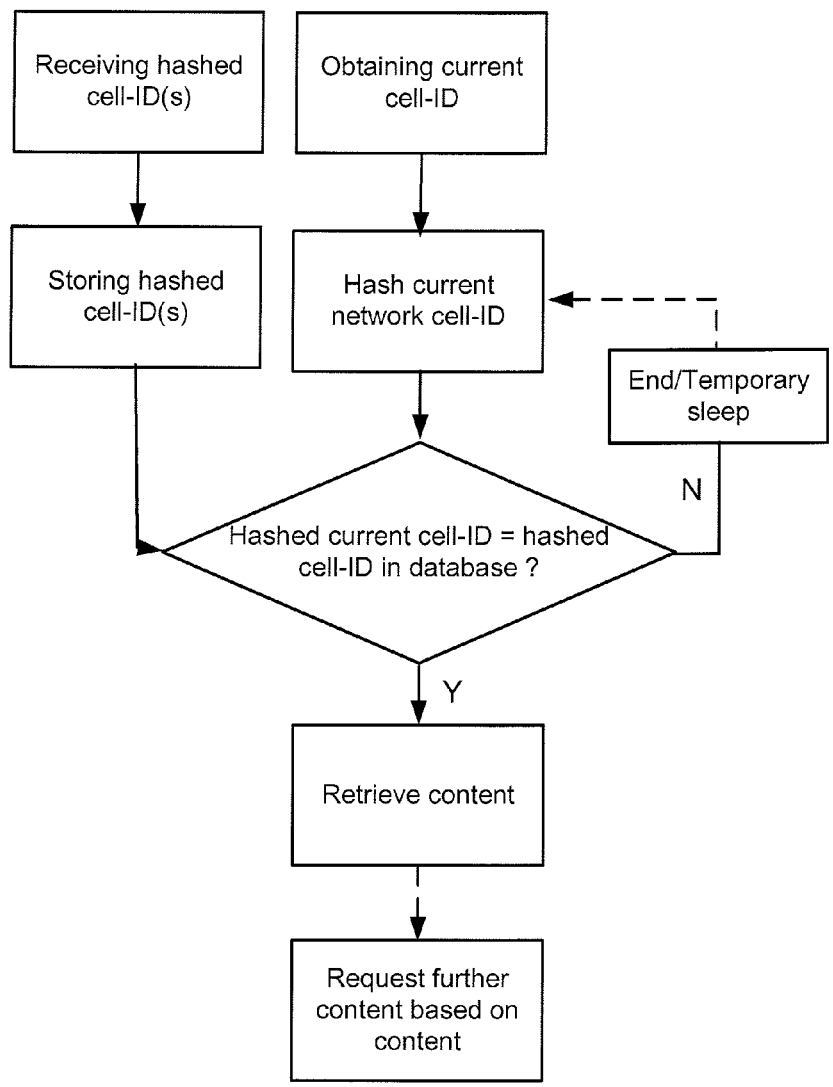
FIG. 13 is a flow diagram of an embodiment of another method for a UE.

To further sum up, FIGS. 12 and 13 show flow diagrams for an embodiment within the scope of the first aspect and the second aspect respectively of the invention. The dashed arrows in these figures indicates optional steps as expressed in dependent claims to the respective independent claims of these aspects.

The invention claimed is:

1. A method performed by a user equipment, comprising:
    sending to a first server host a request message that comprises geographical coordinates and that requests at least one cryptographically hashed network cell-identity,
    receiving from the first server host the at least one cryptographically hashed network cell-identity cryptographically hashed according to a cryptographic hash function,
    storing the at least one cryptographically hashed network cell-identity in a hashtable in the user equipment,
    obtaining a current network cell-identity associated with a network cell to which the user equipment currently is connected,
    generating a cryptographically hashed current network cell-identity by cryptographically hashing the current network cell-identity according to the cryptographic hash function,
    comparing the cryptographically hashed current network cell-identity with cryptographically hashed network cell-identities stored in the hashtable, and
    retrieving from the first server host content associated with the cryptographically hashed current network cell-identity if the cryptographically hashed current network cell-identity is among the cryptographically hashed network cell-identities stored in the hashtable, and
    storing said content in the hashtable in such a way that the content is associated in the hashtable with the cryptographically hashed current network cell identity, thereby enabling subsequent requesting of further content from the first server host or a second server host based on the content associated with the cryptographically hashed current network cell-identity.

2. The method according to claim 1, wherein the cryptographic hash function is a message-digest algorithm.

3. The method according to claim 1, further comprising, if the cryptographically hashed current network cell-identity is the same as at least one cryptographically hashed network cell identity stored in the hashtable, checking if the content or further content associated with the cryptographically hashed current network cell-identity has previously been used, for alerting a user of the user equipment.

4. The method according to claim 1, further comprising displaying a message or an icon on a display in the user equipment, said message or icon corresponding to the content or further content associated with the cryptographically hashed current network cell-identity.

5. A computer program product stored on a non-transitory computer readable medium and comprising a client application that, when run on a user equipment, causes the user equipment to:
    send to a first server host a request message, which comprises geographical coordinates, requesting at least one cryptographically hashed network cell identity, receive from the first server host the at least one cryptographically hashed network cell-identity cryptographically hashed according to a cryptographic hash function, store the at least one cryptographically hashed network cell-identity in a hashtable in the user equipment, obtain a current network cell-identity to which the user equipment currently is connected, generate a cryptographically hashed current network cell-identity by cryptographically hashing the current network cell-identity according to the cryptographic hash function, compare the cryptographically hashed current network cell-identity with cryptographically hashed network cell-identities stored in the hashtable, retrieve from the first server host content associated with the cryptographically hashed current network cell-identity if the cryptographically hashed current network cell-identity is among the cryptographically hashed network cell-identities stored in the hashtable, and store the content in the hashtable in such a way that the content is associated in the hashtable with the cryptographically hashed network cell identity, thereby enabling subsequent requesting of further content from the first server host or a second server host based on the content associated with one of the cryptographically hashed network cell-identities stored in the hashtable.

6. A method performed by a first server host in a communications network, comprising:

receiving from a user equipment a request message that comprises geographical coordinates and that requests at least one cryptographically hashed network cell-identity, looking up, in a server database that is comprised in the first server host or a second server host, at least one network cell-identity associated with a predefined geographical area defined by the geographical coordinates, receiving from the server database the at least one network cell-identity, generating the at least one cryptographically hashed network cell-identity by cryptographically hashing the at least one network cell-identity according to a cryptographic hash function, and sending the at least one cryptographically hashed network cell-identity to the user equipment together with content associated with the at least one network cell-identity, thereby enabling the user equipment to store the content in a hashtable in the user equipment in such a way that the content is associated in the hashtable with the at least one cryptographically hashed network cell identity, and to request further content from the first server host or the second server host based on that content.

7. The method according to claim 6, further comprising triggering looking up of the at least one network cell-identity through a timer function executed in the first server host.

8. The method according to claim 6, further comprising sending to the user equipment at least one updated cryptographically hashed network cell-identity for either: a network cell that is a current network cell in which the user equipment is positioned; or a network cell in a second geographical area surrounding the current network cell, if the network cell-identity for that network cell has changed.

9. A computer program product stored on a non-transitory computer readable medium and comprising a server computer program that, when run on a first server host connectable to a user equipment, causes the first server host to:

receive from a user equipment a request message that comprises geographical coordinates and that requests at least one cryptographically hashed network cell-identity, look up, in a server database that is comprised in the first server host or a second server host, at least one network cell-identity associated with a predefined geographical area defined by the geographical coordinates, receive from the server database the at least one network cell-identity, generate the at least one cryptographically hashed network cell-identity by cryptographically hashing the at least one network cell-identity according to a cryptographic hash function, and send the at least one cryptographically hashed network cell-identity to the user equipment together with content associated with the at least one network cell-identity, thereby enabling the user equipment to store the content in a hashtable in the user equipment in such a way that the content is associated in the hashtable with the at least one cryptographically hashed network cell identity, and to request further content from the first server host or the second server host based on that content.

10. A user equipment comprising:

a requesting circuit configured to send to a first server host a request message that comprises geographical coordinates and that requests at least one cryptographically hashed network cell-identity, a receiving circuit configured to receive from the first server host the at least one cryptographically hashed network cell-identity cryptographically hashed according to a cryptographic hash function, a hashtable configured to store the at least one cryptographically hashed network cell-identity, an obtaining circuit configured to obtain a current network cell-identity associated with a network cell to which the user equipment currently is connected, a hashing circuit configured to generate a cryptographically hashed current network cell-identity by cryptographically hashing the current network cell-identity according to the cryptographic hash function, a comparing circuit configured to compare the cryptographically hashed current network cell-identity with cryptographically hashed network cell-identities stored in the hashtable, and a retrieving circuit configured to retrieve from the first server host content associated with the cryptographically hashed current network cell-identity if the cryptographically hashed current network cell-identity is among the cryptographically hashed network cell-identities stored in the hashtable, wherein the hashtable is further configured to store the content in the hashtable in such a way that the content is associated in the hashtable with the cryptographically hashed current network cell identity, thereby enabling subsequent requesting of further content from the first server host or a second server host based on the content associated with the cryptographically hashed current network cell-identity.

11. The user equipment according to claim 10, further comprising a checking circuit configured to, if the cryptographically hashed current network cell-identity is the same as at least one cryptographically hashed network cell identity stored in the hashtable, check if the content or further content associated with the cryptographically hashed current network cell-identity has previously been used, for alerting a user of the user equipment.

12. The user equipment according to claim 10, further comprising a display and a displaying circuit configured to display a message or an icon on the display, the message or icon corresponding to the content or further content associated with the cryptographically hashed current network cell-identity.

13. A first server host configured to connect to a communications network, comprising:
  a first receiving circuit configured to receive from a user equipment a request message that comprises geographical coordinates and that requests at least one cryptographically hashed network cell-identity,
  a lookup circuit configured to look up, in a server database that is comprised in the first server host or a second server host, at least one network cell-identity associated with a predefined geographical area defined by the geographical coordinates,
  a second receiving circuit configured to receive from the server database the at least one network cell-identity,
  a cryptographic hashing circuit configured to generate the at least one cryptographically hashed network cell identity by cryptographically hashing the at least one network cell-identity according to a cryptographic hash function, and
  a sending circuit configured to send the cryptographically hashed network cell-identity to the user equipment together with content associated with the at least one network cell-identity, thereby enabling the user equipment to store the content in a hashtable in the user equipment in such a way that the content is associated in the hashtable with the at least one cryptographically hashed network cell identity, and to request further content from the first server host or the second server host based on that content.

14. The first server host according to claim 13, further comprising a timer function configured to trigger the look up.

15. The first server host according to claim 13, wherein the sending circuit is configured to send to the user equipment at least one updated cryptographically hashed network cell-identity for either: a network cell that is a current network cell in which the user equipment is positioned; or a network cell in a second geographical area surrounding the current network cell, if the network cell-identity for that network cell has changed.

* * * * *